June 1, 1926.
W. E. WINE
TRACTOR WHEEL
Filed July 11, 1925
1,586,933
2 Sheets-Sheet 2
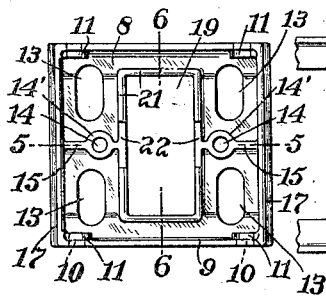
Fig.4.
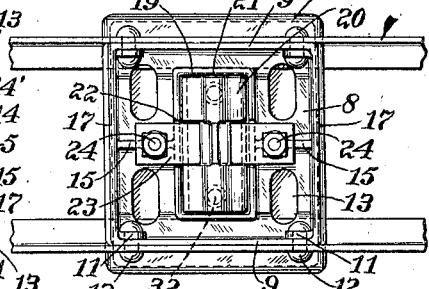
Fig.3.
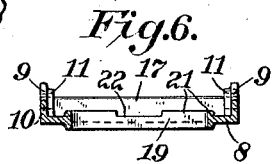
Fig.6.
Fig.5.
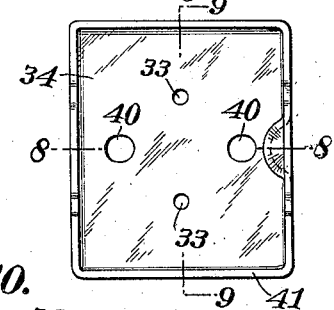
Fig.7.
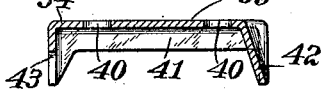
Fig.8.
Fig.9.
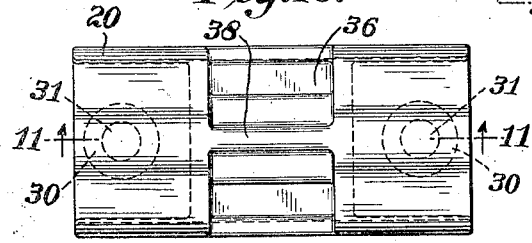
Fig.10.
Fig.14.
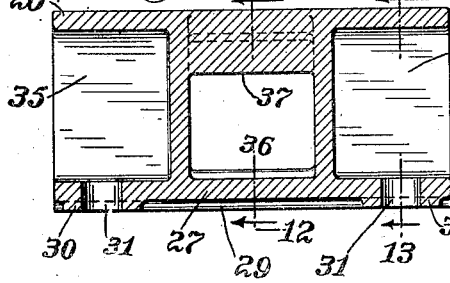
Fig.11.
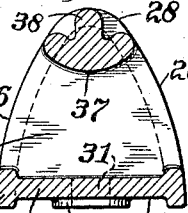
Fig.12.
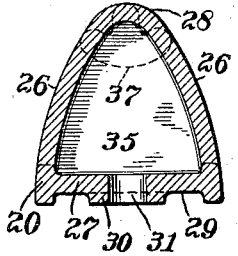
Fig.13.
Inventor:
William E. Wine,
by Parker Cook Atty.

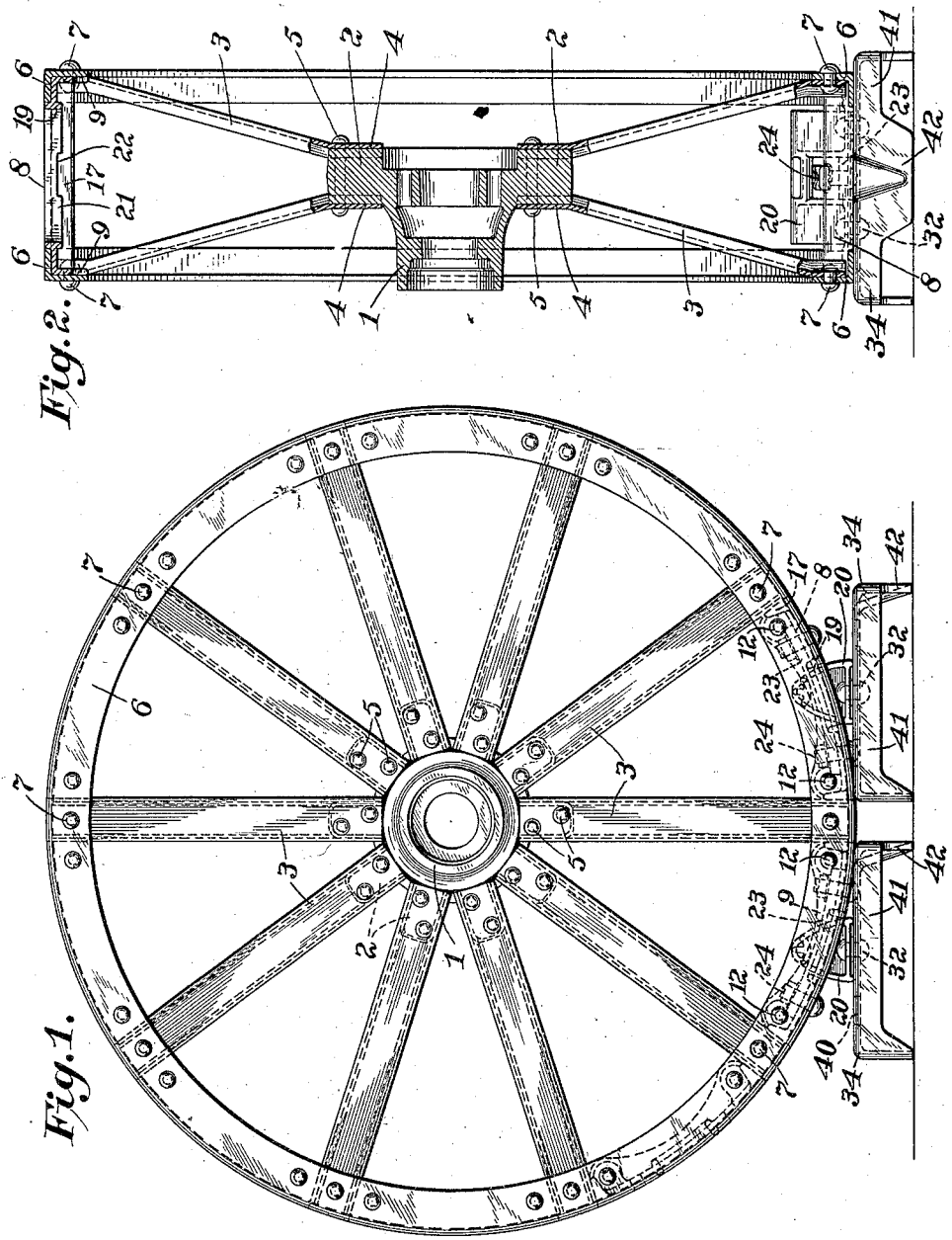

Patented June 1, 1926.

1,586,933

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR WHEEL.

Application filed July 11, 1925. Serial No. 42,998.

My invention relates to new and useful improvements in tractor wheels, and more particularly to a tractor wheel which is made up of a hub, a plurality of spokes, and two bands forming a skeleton rim in which are secured a plurality of casings, the said casings being so arranged as to form a relatively wide rim. Each of said casings are so arranged that a retaining means may fit therein, the retaining means in turn each carrying a tread member.

One of the principal objects of the invention is to provide a tractor wheel which may be quickly and readily assembled, a skeleton rim being formed of two angle members in which are secured a plurality of small casings or housings, the opposite ends of each casing abutting against the adjacent spoke to thereby strengthen the wheel and prevent any torque or shearing action. These casings also each house a tractor shoe, the tractor shoe comprising a retaining member and a tread member, the retaining means being so arranged that the shoe as a whole may rock or tilt with the rotation of the wheel.

The tractor shoes, in their broadest aspect, that is, considering them as consisting of a retaining means and tread member, the retaining means adapted to pass through a rim or casing, are similar to the shoes shown in my several co-pending applications of recent date, such as those bearing Serial Numbers 21,609, filed April 8, 1925; 23,335 filed April 15, 1925; 24,049 filed April 18, 1925; 26,697 filed April 29, 1925; and 38,678 filed June 22, 1925.

In the present application, however, the retaining means is different in structure in that a locking bar passes therethrough to hold the retaining means and its tread member to the rim of the wheel.

Another object of the present invention, is to provide a tractor wheel which is very strong and efficient in service, though relatively light in weight, and wherein the housings forming the rim not only support the tractor shoes, but strengthen the wheel as a whole as they abut against the spokes at their outer ends to thereby tightly hold the same in position.

With these and other objects in view, which will be more fully described as the specification proceeds, the invention consists in certain new and novel constructions and combination of parts as will be hereinafter more fully described and pointed out in the claims.

In the drawings, showing a preferred embodiment of my invention;

Fig. 1 is a side elevation of my improved tractor wheel, two of the tractor shoes being shown in the position they will occupy when contacting with the surface over which they are passing.

Fig. 2 is a vertical sectional view of the same, only one shoe being shown as attached to the wheel.

Fig. 3 is a plan view from the inside of one of the casings showing a tractor shoe secured in place, a portion of the tread member and the flanges of the rim being also shown.

Fig. 4 is a detailed plan view of a housing with the tractor shoe removed for the sake of clearness.

Fig. 5 is a sectional view taken on line 5—5 of Fig. 4.

Fig. 6 is a detailed sectional view of the housing taken on line 6—6 of Fig. 4.

Fig. 7 is an outer plan view of one of the tread members.

Fig. 8 is a sectional view taken on line 8—8 of Fig. 7.

Fig. 9 is a sectional view of the tread member taken on line 9—9 of Fig. 7 looking in the direction of the arrow.

Fig. 10 is an inner plan view of the retaining member.

Fig. 11 is a vertical sectional view of the same taken on line 11—11 of Fig. 10.

Fig. 12 is a sectional view of the retaining means taken on line 12—12 of Fig. 11.

Fig. 13 is a detailed sectional view of the retaining means taken on line 13—13 of Fig. 11, and Fig. 14 is a perspective of the locking bar.

Referring now more in particular to Figs. 1 and 2 of the drawings, there is shown my new improved tractor wheel comprising a hub 1 having the annular positioned lugs 2 to which in turn are riveted a plurality of metal spokes 3. These spokes 3 are preferably angles having the vertical inner portions 4 riveted as at 5 to the lugs 2 and overlapping the same at their sides.

The perimeter of the wheel is formed by the two bands 6 which are preferably angle irons, one of the legs of each band extending inwardly, while to the downwardly extending remaining leg of each band are riveted the outer ends of the spokes 3 as shown at 7. Any number of spokes may be employed, but the distance between the outer ends of the spokes determines the length of the housings 8 which are secured in the bands 6. I have found that ten pairs will provide the desired strength for the wheel, but a greater or lesser number may be used.

The housings 8 are designed to be securely riveted within the opposite legs of the bands 6 and to abut against the outer ends of the adjacent spokes 3 so that the spokes are not only tightly riveted to the hub and to the skeleton rim formed of the outer bands 6, but are also rigidly held between the end walls of the numerous housings.

The bands 6, together with the housings 8, form the complete rim of the wheel, and the housings 8 will now be described more in detail. As they are all similar in construction, a description of one is a description of all.

Housings.

As may be clearly seen in Figs. 3, 4, 5 and 6, each housing comprises a steel casting rectangular in form, and slightly convexed on its outer surface, the convexity being of such a degree that ten of them will form the perimeter or rim of the wheel. Of course, if a larger wheel is constructed and more spokes desired, the outline of the housing will be made to conform to the necessary condition.

The opposite side walls 9 of the housing are cut out as shown, while at the opposite ends there are the small openings 10 reinforced by the bosses 11, so that the rivets 12 may tightly secure the housing within annular bands 6 of the wheel.

As may also be seen in Fig. 4, the castings may be hollowed out as at 13 for the sake of lightness, while two holes 14 are provided centrally of the housing with small bosses 14' being shown for strengthening the same, also small strengthening ribs 15 are provided which extend from theses bosses to the end walls 17 of the housing, which walls are strengthened by the use of more metal as may be seen in Fig. 5. It will be appreciated that any number of strengthening ribs may be provided, depending, of course, upon the size of the housing.

Also formed centrally in this housing 8, is the rectangular opening 19 for the reception of a retaining means 20, to be shortly described. About the edges of this opening 19 there is provided the rib or rim 21 as may be seen in Figs. 5 and 6, to reinforce these boundary walls, while a portion of the rib 21 is cut out as at 22 so that a curved locking bar 23 may lie within this groove in the rim, the bar also passing through the retaining means 20 as will be shortly described. Bolts 24 are passed through openings 25 in the locking bar 23 and through the holes 14 in the housing 8 to hold the retaining means in position.

Retaining means.

Referring now to the retaining means and to Figs. 10 to 13, there is shown a metal casting in the form of a tooth having the sloping side walls 26, the base 27 and the rounded apex or crown 28. The base 27 is preferably cored as at 29, to leave the small bosses 30 near the opposite ends in the base of the tooth, and abut the rivet holes 31, so that rivets 32 may be passed through them and through rivet holes 33 formed in the tread members 34 (which will be shortly described). The general outline of this retaining means is similar to the retaining means shown in my several co-pending applications, but the internal structure is different in that the major portion of the tooth is left open. In other words, two pockets 35 are shown one at each of the ends of the tooth, and there is also a transverse passageway 36 formed centrally thereof, so that the locking bar 23 may pass therethrough and be bolted to the housing 8 as heretofore described. The inner surface 37 of the transverse passageway 36 is struck on an arc so that there may be a rolling action between the bar 23 and this surface 37. The surface 37 is rounded at its outer extremities and is then rounded at its inner portion, as may be seen at 38, this rib lying flush with the crown 28 of the tooth or retaining means.

By forming the retaining means in this manner, the side walls 26 may rock within the opening 19 and contact with the rim or rib 21 about the opening 19 of the casing 8, thus properly securing the retaining means within its casing and directing the wear to the reinforced part thereof. Also by forming the retaining means with the transverse passageway, the locking bar 23 may be quickly passed therethrough and bolted to the casing. The rolling action between the rocking bar and the surface 37 provides for a minimum of frictional wear on the bar, thus calling for long and continued service.

Tread members.

Referring now to the tread members 34, and as shown in Figs. 7, 8 and 9 in detail, each one comprises a pressed member which may be struck from a blank or sheet of steel and then subjected to the proper dies in say a hundred ton press.

The tread member is similar to the various forms of tread members shown in my numerous applications, is semi-box-like in construction having the flat inner surface 39 provided with the aforementioned holes 33, and also with the openings 40, so that the bolt heads 24 may fit within them and allow the tread surface 39 of the shoe to lie flush with the outer surface of the housing 8 as the wheel revolves.

These tread members also have the outwardly extending encircling flanges 41, the one portion thereof extending downwardly to form the tooth 42 in the front, while the rear side is cut out as at 43 to thereby present a staggered traction effect.

As heretofore mentioned, the retaining means 20 is securely riveted to the inner surface of the tread member and this retaining means, together with the tread member and rocking bar 23 comprises the traction shoes, which are equally distributed about the rim of the wheel.

The assembly of the wheel is relatively simple, the spokes being riveted to the lugs on the hub, and at their outer ends to the two angle iron rims 6, after which the housings are laid within these two rims and riveted thereto the outer ends of each of the housings abutting against the adjacent spoke to prevent any shearing action and to brace the wheel as a whole. After the housings are in position, the retaining members with the treads secured thereto will be placed within the openings of the respective housings and the locking bar 23 bolted in place.

The retaining means move inwardly and outwardly in the casings as the wheel revolves, and the load falls upon the tread members and the casings. The locking bars will rockingly support the retaining means and tread members in position, and the only load upon the rocking bars is the weight of the retaining means and tread members.

From the foregoing it will be seen that I have designed and invented a tractor wheel relatively light in weight, wherein a plurality of housings form the rim of the wheel and at the same time provide means for supporting a plurality of tread members which will assume a horizontal position at the bottom of the wheel and will rock or tilt as they are carried up around the wheel.

It will also be seen that I have invented a novel form of retaining means, whereby a locking bar may be slipped therethrough thus to securely hold the retaining means and shoes in position and at the same time allow them to move upwardly and to tilt, to thereby reduce the wear and still present a maximum traction effort.

Many slight changes might be made without in any way departing from the spirit and scope of the invention.

Having thus described my invention, what I claim as new and desire to secure by Letters Patent is:—

1. A tractor wheel comprising a plurality of casings adapted to be secured to the rim of the wheel, said casings adapted to abut the outer end of the spokes to thereby strengthen the wheel, each of said casings provided with a central reinforced aperture, a tractor shoe for each of said casings comprising a tooth-shaped retaining means having a transverse passage extending therethrough and having an arcuate inner upper surface, the retaining means fitting within the aperture in said casing, a locking bar passed through the said transverse passageway and bolted within the casing, and the said tractor shoe rockably held within said casing.

2. A tractor wheel comprising a plurality of casings adapted to be secured to the rim of the wheel, each of said casings provided with a central aperture, a plurality of tractor shoes comprising a retaining means and a thread member, said retaining means adapted to respectively fit within each of said casings, each of said retaining means provided with open ends and a transverse central passageway having a rounded upper inner surface, a locking bar for each retaining means and passing through said retaining means and bolted within the casing to thereby tiltably support the said tractor shoe.

3. A tractor wheel comprising a plurality of casings adapted to fit within a rim, a tractor shoe for each casing comprising a tread member and a retaining means, said retaining means comprising a tooth shaped casing having open pockets at its opposite ends and a transverse central passageway, the upper inner surface of said passageway being arcuate, a curved locking bar passing through the said retaining means after the latter has been passed within the casing and bolted to the casing to thereby rockably support said tractor shoe.

4. A tractor wheel comprising a plurality of casings and a plurality of tractor shoes, each of said tractor shoes comprising a substantially triangular-shaped retaining means having arcuate side walls, said retaining means being hollow and having open-end pockets at its opposite end and a transverse passageway, the latter having a curved upper inner surface, said retaining means fitting within said casing, and a locking bar respectively passed through said transverse passageway to thereby rockably hold the said tractor shoe to said casings.

5. A tractor shoe comprising a casing adapted to be secured to the rim of a wheel, said casing having a central opening therein, a retaining means having arcuate side walls and a base, a transverse passageway extending through said retaining means, the upper inner surface of the passageway being arcuate in form, a tread member secured to the base of said retaining means, said retaining means extending up within the opening in the casing, an arcuate locking bar extending through said transverse passageway in said retaining means, and said locking bar secured to said casing to thereby rockingly support the said retaining means and tread member.

6. A tractor shoe comprising a retaining means, tooth-shaped in form and having a central transverse passageway extending in height from the base of the tooth nearly to the crown, a rib extending across the upper end of the passageway, said rib widening to form an arcuate upper surface of the passageway, and the ends of the arc merging with the side walls of the tooth-shaped retaining means.

7. A tractor shoe comprising in part a retaining means in the form of a casting having hollow ends and a transversely extending passageway centrally of the retaining means, said retaining means being substantially in the shape of an inverted U and having a base merging with the side walls, a rib forming the upper surface of the passageway, the lower surface of the rib being arcuate in form, and a locking bar extending through said passageway and cooperating with said rib to rockingly support said retaining means.

8. A tractor shoe comprising a casing adapted to be secured to the rim of a wheel, said casing having a central opening therein, a toothed-shaped retaining means having a transverse passageway extending centrally therethrough, the inner upper surface of the passageway being ribbed and arcuate in form, said arcuate surface extending from one of the side walls of the retaining means to the other, a tread member rigidly secured to the base of said retaining means, a locking bar extending through said transverse passageway, the depth of the passageway being greater than the thickness of the locking bar so that the retaining means may move inwardly and outwardly with respect to the locking bar, and said locking bar secured near its opposite end to said casing to rockingly support the retaining means and tread member.

In testimony whereof I affix my signature.

WILLIAM E. WINE.